(No Model.)
T. J. COPE.
APPARATUS FOR LAYING CONDUCTORS IN CONDUITS.
No. 443,824. Patented Dec. 30, 1890.
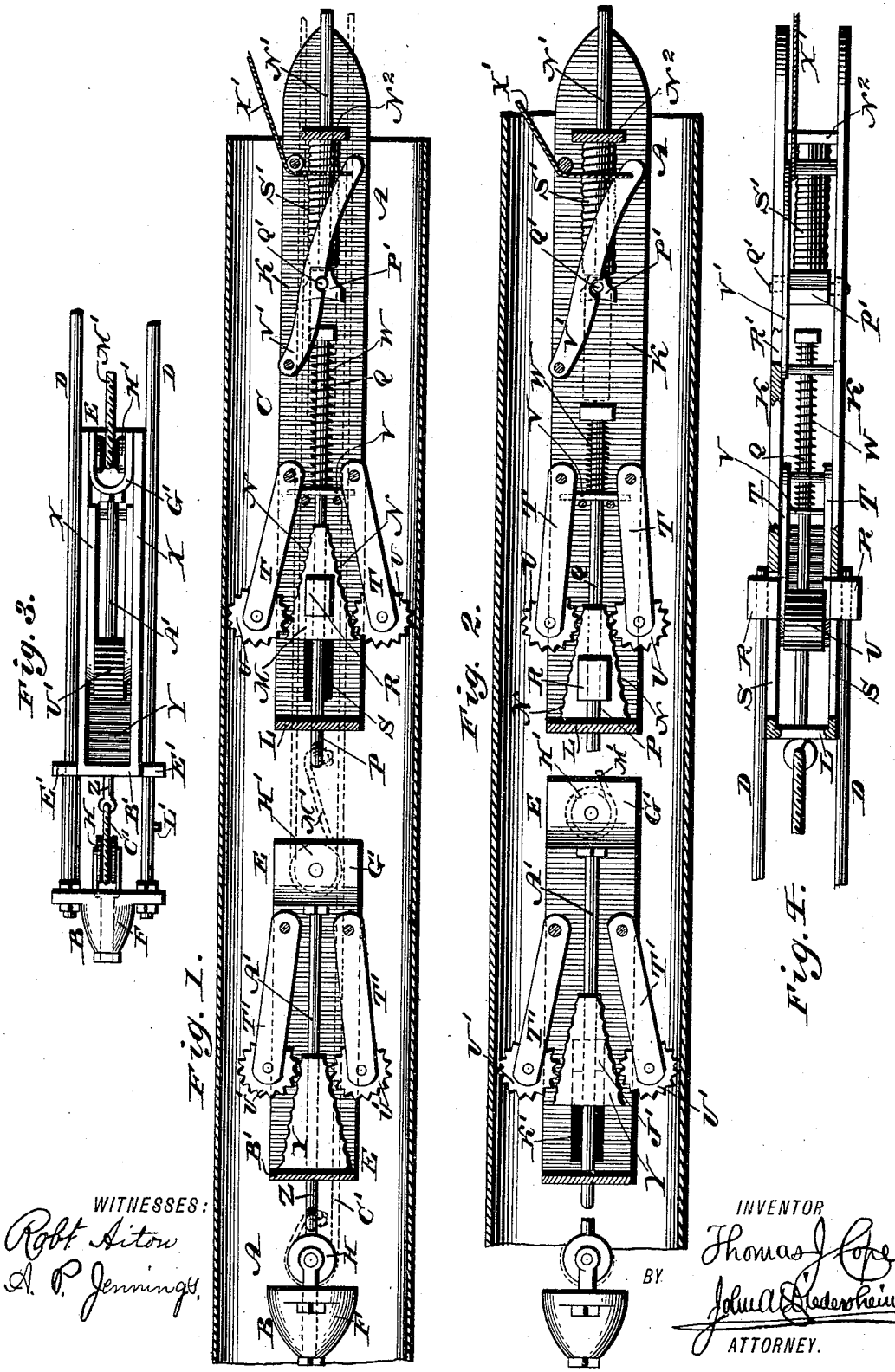

UNITED STATES PATENT OFFICE.

THOMAS J. COPE, OF PHILADELPHIA, PENNSYLVANIA.

APPARATUS FOR LAYING CONDUCTORS IN CONDUITS.

SPECIFICATION forming part of Letters Patent No. 443,824, dated December 30, 1890.

Application filed September 4, 1890. Serial No. 363,890. (No model.)

*To all whom it may concern:*

Be it known that I, THOMAS J. COPE, a citizen of the United States, residing in the city and county of Philadelphia, State of Pennsylvania, have invented a new and useful Improvement in Apparatus for Laying Electric Conductors in Conduits, which improvement is fully set forth in the following specification and accompanying drawings.

My invention relates to improvements in apparatus for laying electric conductors in conduits and it consists of a device formed of parts adapted to be moved one upon the other, substantially as hereinafter described.

It also consists of mechanism, substantially as described, for operating said parts.

It also consists of novel locking devices for said parts.

It further consists of the combination of parts hereinafter set forth.

Figure 1 represents a longitudinal section of an apparatus for laying electrical conductors in conduits, as embodied in my invention, in operation. Fig. 2 represents the same device in another position in the conduit from that shown in Fig. 1. Fig. 3 represents a side view of a part of the device. Fig. 4 represents a side view of the remaining parts of the device.

Similar letters of reference indicate corresponding parts in the several figures.

Referring to the drawings, A designates a device adapted to be inserted at one end of a conduit, and by the movement of its parts advances through said conduit to the opening at the other end thereof. The said device consists of a head part B, tail part C, connecting and guide rods D, and carrier E, with the other detail parts hereinafter described. The head B is formed of a shell F, having secured thereto the guiding-rods D, and it is also provided with a pulley H, suitably journaled thereon. The other ends of the rods D pass through openings in the tail-pieces C, which latter are formed of two opposite side pieces K, having a connecting-head L. Within the sides K is a wedge-shaped piece M, having the corrugated sides N and projecting stems P and Q, the former passing through an opening in the head L. On the sides of the said wedge are projections R, which work in the slots S in the sides K and to which the rods D are secured. Pivoted to the sides K are the arms T, having the rollers U thereon adapted to be in contact with and be operated by the movement of the wedge M, so as to bear against the walls of the conduit. The stem Q passes through a cross-piece V, connecting the sides K, and is provided at its end with a head between which and the cross-piece a coil-spring W is placed, the said spring assisting the rods in forcing the wedge between the rollers, and thereby keeping the wedge from contact with the head L.

The carrier E is provided on its sides with lugs E', having openings therein, through which pass the guide-rods D, so that the carrier may move freely thereon from the tail-piece to the head of the device. Within the sides X of the carrier is a wedge Y, having corrugated sides and stems Z and A', the former passing through the cross-piece or head B' of the carrier and secured to a cord, rope, or other flexible connecting means C', which passes over the pulley H and through openings in the lugs E' of the carrier and an opening in a lug on the side of the tail-piece, the stem A' having connected therewith a bracket G', forming a journal-bearing for a pulley H'. On the sides of the wedge Y are guiding-pieces J', which work in the slots K' of the sides X. To the inner side of the walls of the carrier are pivoted the arms T', having the rollers U' journaled therein, the said arms and rollers being similar in form and function to the arms and rollers T and U, respectively, of the tail-piece C. Secured to one of the rods D at a short distance from the head B is a stop L' to limit the movement of the carrier. To the stem P of the wedge M is attached a cord or rope M', which passes over the pulley H' and then through an opening in a lug on the side of the tail-piece C. On a rod N', movable in a cross-bar N² of the tail-piece and provided with a head P', having the guiding-pins Q', which work in the slots R' of the sides K, is a spring S', which bears against the said head P' and the cross-piece N² and is of greater tension than the spring W on the stem Q of the wedge M, so as to be adapted when released from its locking-lever V', pivoted to one of the sides K, to cause the head P' to bear against the end of the stem Q, so that the wedge M is forced toward the head L of the tail-piece, thereby permitting the arms T to come nearer together, so that the rollers U will no longer engage the sides of the walls of the conduit.

The manner of operating the device is as follows: The device is inserted in the conduit and the cord or rope C' is pulled or drawn so as to move the carrier E on the rods D until it reaches the stop L', when the rope M' is pulled, which causes the wedge Y to be drawn in the carrier, so as to bear against the rollers U', forcing the same outward and against the sides of the conduit, so that the carrier becomes wedged or blocked therein. The further pulling on the rope M' draws on the wedge M, which is brought into contact with the head L, and thereby carries the tail-piece C toward the carrier E, the rods D moving through the slotted lugs on the sides of the said carrier and the rollers U being free to approach each other, so as not to block the tail-piece in the conduit. When the tail-piece has reached the carrier and the rope M' is no longer drawn, by pulling the rope C' the parallel rods, assisted by the spring W, will operate the wedge M so that the rollers U are forced outward and against the walls of the conduit, blocking the tail-piece C therein. By now pulling on the rope C' the wedge Y is drawn in the same, so as to permit the approach of the rollers U', thus freeing the carrier, and as the wedge comes in contact with the head B' the further pulling on the rope draws the carrier on the rods D, toward the head B of the device. As will be seen, the advance of the device will be caused by successive pullings on the ropes C' and M' and the successive advances of the carrier and tail-piece. Should, however, the device meet with an obstruction in the conduit, so as to cause it to become necessary to withdraw the same, a pull on the cord X', which is connected with the locking-lever V', will free the rod N', so that the spring S' thereon can act, and as the same is of greater tension than the spring W of the stem Q it will force the head of the said rod N' against the said stem Q, so as to move the wedge M toward the head L of the tail-piece, and thereby permit the approach of the rollers U' toward each other. By now pulling on both of the ropes C' and M' the device can readily be withdrawn from the conduit.

Having thus described my invention, what I claim as new, and desire to secure by Letters Patent, is—

1. An apparatus for laying electric conductors in conduits, having a head, a tail-piece, a carrier, and guiding-rods, the latter connected with the head and tail-piece and having the carrier movable thereon, said parts being combined substantially as described.

2. An apparatus for laying electric conductors in conduits, having a head, a carrier with a blocking device, and guiding-rods, the latter connected with said head and the carrier being movable on said guiding-rods, said parts being combined substantially as described.

3. An apparatus for laying electric conductors in conduits, having a head, a tail-piece, guiding-rods connecting said head and tail-piece, a carrier movable on said guiding-rods and having locking-rollers connected therewith, and mechanism for operating said carrier, said parts being combined substantially as described.

4. An apparatus for laying electric conductors in conduits, having a head, a tail-piece, guiding-rods connected with said head and tail-piece, a pulley journaled on said head, a carrier movable on said connecting-rods, and a rope connected with said carrier and passing around said pulley, said parts being combined substantially as described.

5. An apparatus for laying electric conductors in conduits, having a head, a tail-piece, connecting-rods, a carrier movable in said rods, a pulley on said head, a wedge adapted to move in said carrier and also contact with the head thereof, rollers journaled in pivoted arms and adapted to contact with said wedge, and a rope connected with the wedge and passing around the pulley on the head, said parts being combined substantially as described.

6. An apparatus for laying electric conductors in conduits, having a carrier with a movable wedge, locking-rollers in contact with said wedge and operated thereby, and means, substantially as described, for operating said wedge, said parts being combined substantially as described.

7. An apparatus for laying electric conductors in conduits, having a head, a tail-piece, rods connecting said head and tail-piece, a carrier movable on said rods, a pulley on said head, a wedge movable in the carrier and having a pulley mounted in an attachment thereof, a rope connected with said wedge and passing over the pulley of the head, locking-rollers in contact with the wedge and operated thereby, a wedge movable in the tail-piece, locking-rollers for the tail-piece in contact with the said wedge thereof and operated thereby, a spring for normally keeping said tail-piece wedge in position for locking said rollers, and a rope connected with the said wedge and passing over the pulley of the carrier, said parts being combined substantially as described.

8. In an apparatus for laying electric conductors in conduits, a tail-piece having a wedge movable therein and having a stem provided with a head and projecting through a cross-piece of the tail-piece, a spring mounted on said stem and bearing against the cross-piece and head of the stem, rollers mounted on pivoted arms and in contact with said wedge, a sliding rod adapted to bear against the end of the said stem and having an operating-spring of greater tension than the before-mentioned stem-spring, and a locking device for said rod, said parts being combined substantially as described.

9. An apparatus for laying electric conductors in conduits, having a head, a tail-piece, connecting-rods, a carrier movable on said rods, said tail-piece and carrier being each provided with a movable wedge and locking-rollers, the latter operated by the movement of said wedge, and a releasing device secured to the tail-piece for the locking-rollers, said parts being combined substantially as described.

10. An apparatus for laying electric conductors in conduits, having a head, a tail-piece, connecting-rods, a carrier movable on said rods, separate locking mechanisms for said tail-piece and carrier, and a stop on the rod near the head thereof, said parts being combined substantially as described.

11. An apparatus for laying electric conductors in conduits, having a head, a tail-piece, guiding-rods connected to the head and to a wedge movable in the tail-piece, a carrier movable on the said rods and having locking-rollers therefor, locking-rollers in contact with the wedge of the tail-piece, and a spring on the stem of the said wedge for keeping the said wedge in such position as to permit the free movement of the rollers in the conduit, said parts being combined substantially as described.

12. An apparatus for laying electric conductors in conduits, having a head, a tail-piece, rods connecting said head and tail-piece, a carrier mounted on said rods so as to move thereon, mechanism, substantially as described, for moving said carrier on said rods, mechanism, substantially as described, for locking said tail-piece in the conduit, mechanism, substantially as described, for moving said rods with head and tail-piece on said carrier, and mechanism for locking said carrier in the conduit, said parts being combined substantially as described.

13. In an apparatus for laying electric conductors in conduits, a sliding wedge with an operating-spring, and locking-rollers, in combination with a sliding rod having a controlling-spring of greater tension than the operating-spring of the wedge, and the locking-lever, substantially as described.

14. An apparatus for laying electrical conductors in conduits, having a head, a tail-piece, rods connecting said head and tail-piece, a carrier movable on said rods, and separate ropes secured to said carrier and tail-piece, respectively, for moving each of said latter parts relatively to the other, all combined substantially as described.

THOMAS J. COPE.

Witnesses:
  JOHN A. WIEDERSHEIM,
  A. P. JENNINGS.